United States Patent [19]

Carlson et al.

[11] Patent Number: 4,744,030
[45] Date of Patent: May 10, 1988

[54] METHOD AND APPARATUS FOR MEASURING INTERNAL CASING WEAR

[75] Inventors: Norman R. Carlson; James C. Barnette, both of Houston, Tex.

[73] Assignee: Western Atlas International, Inc., Houston, Tex.

[21] Appl. No.: 858,412

[22] Filed: Apr. 29, 1986

[51] Int. Cl.$^4$ .............................................. G01V 1/40
[52] U.S. Cl. ................................... 364/422; 181/105; 367/35
[58] Field of Search .................. 250/256; 364/422; 367/35; 181/105

[56] References Cited

U.S. PATENT DOCUMENTS

| | | | |
|---|---|---|---|
| 4,255,798 | 3/1981 | Havira | 367/35 |
| 4,450,354 | 5/1984 | Smith, Jr. et al. | 250/256 |
| 4,585,939 | 4/1986 | Arnold et al. | 250/256 |
| 4,685,092 | 8/1987 | Dumont | 367/35 |
| 4,701,892 | 10/1987 | Anderson | 367/35 |
| 4,703,427 | 10/1987 | Catala et al. | 364/422 |

FOREIGN PATENT DOCUMENTS 1189944  7/1985  Canada ................................ 181/105

OTHER PUBLICATIONS

Dresser Atlas Casing Evaluation Services, pp. 4–6 and 61–122, 1985.

Primary Examiner—Charles E. Atkinson
Assistant Examiner—Clark A. Jablon
Attorney, Agent, or Firm—Patrick H. McCollum

[57] ABSTRACT

A method of identifying the presence, type and extent of internal casing wear and distinguish worn casing from various types of unworn casing. Two inspection instruments are tied together in the combination traverses a section of casing where information on internal wear is desired. The first inspection instrument generates two signals related to the minimum and maximum wall thickness present at each location within the casing section. The second inspection instrument generates a signal related to the degree of phase shift at each location of the casing section. The present invention analyzes these three signals and generates a differential crossplot whereby for each location of the casing section, a point-pair is plotted, both points of the point-pair having the same phase shift curve differential (calculated from the degree of the phase shift data series) as the X-coordinate and a maximum and minimum radius curve differential (calculated from the minimum and maximum wall thickness data series respectively) as respective Y-coordinates. Analysis of the differential crossplot may then be made, either along or in conjunction with the calculated round casing line to identify the presence, type and extent of internal casing wear and distinguish worn casing from various types of unworn casing.

13 Claims, 7 Drawing Sheets

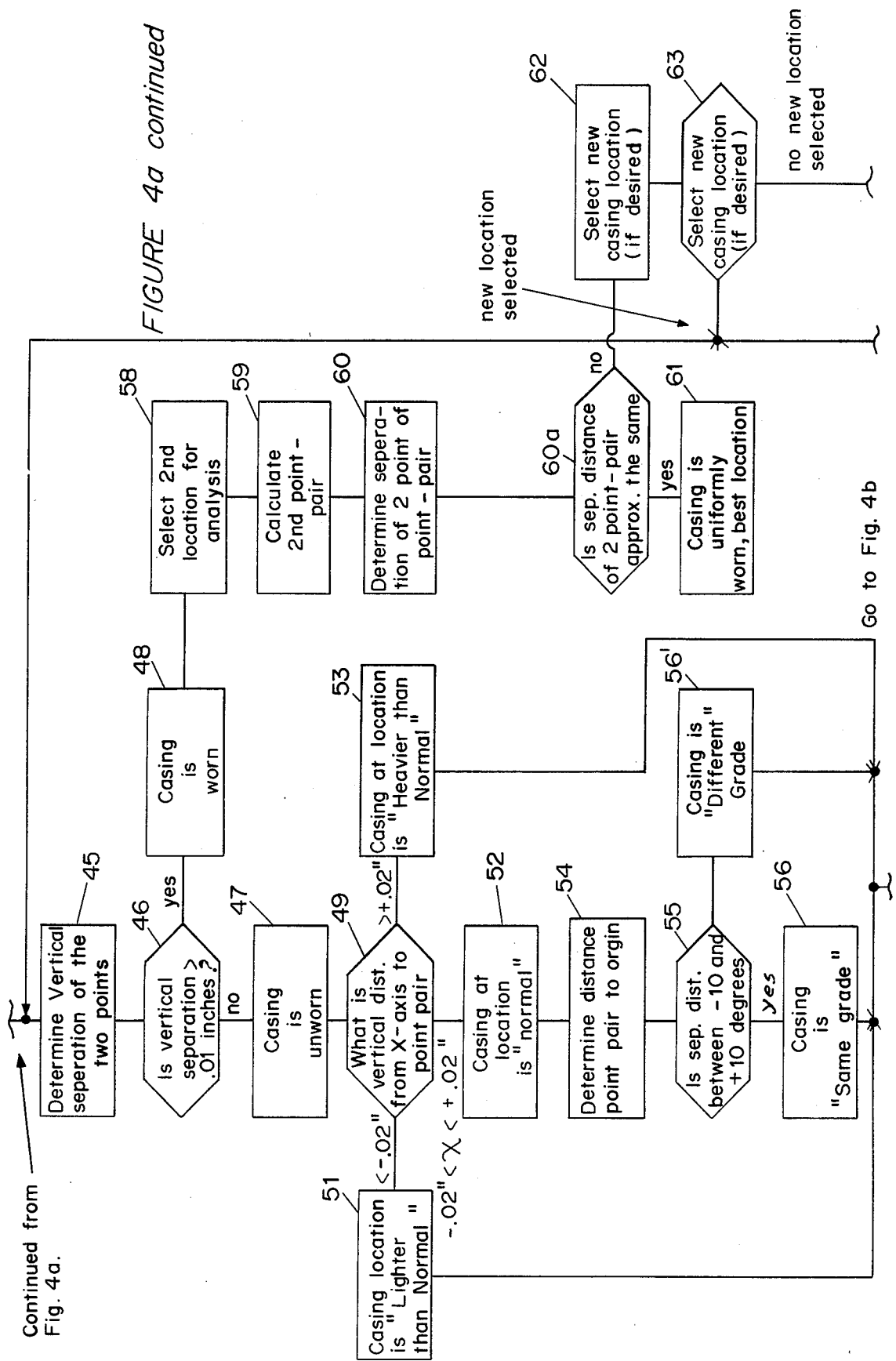

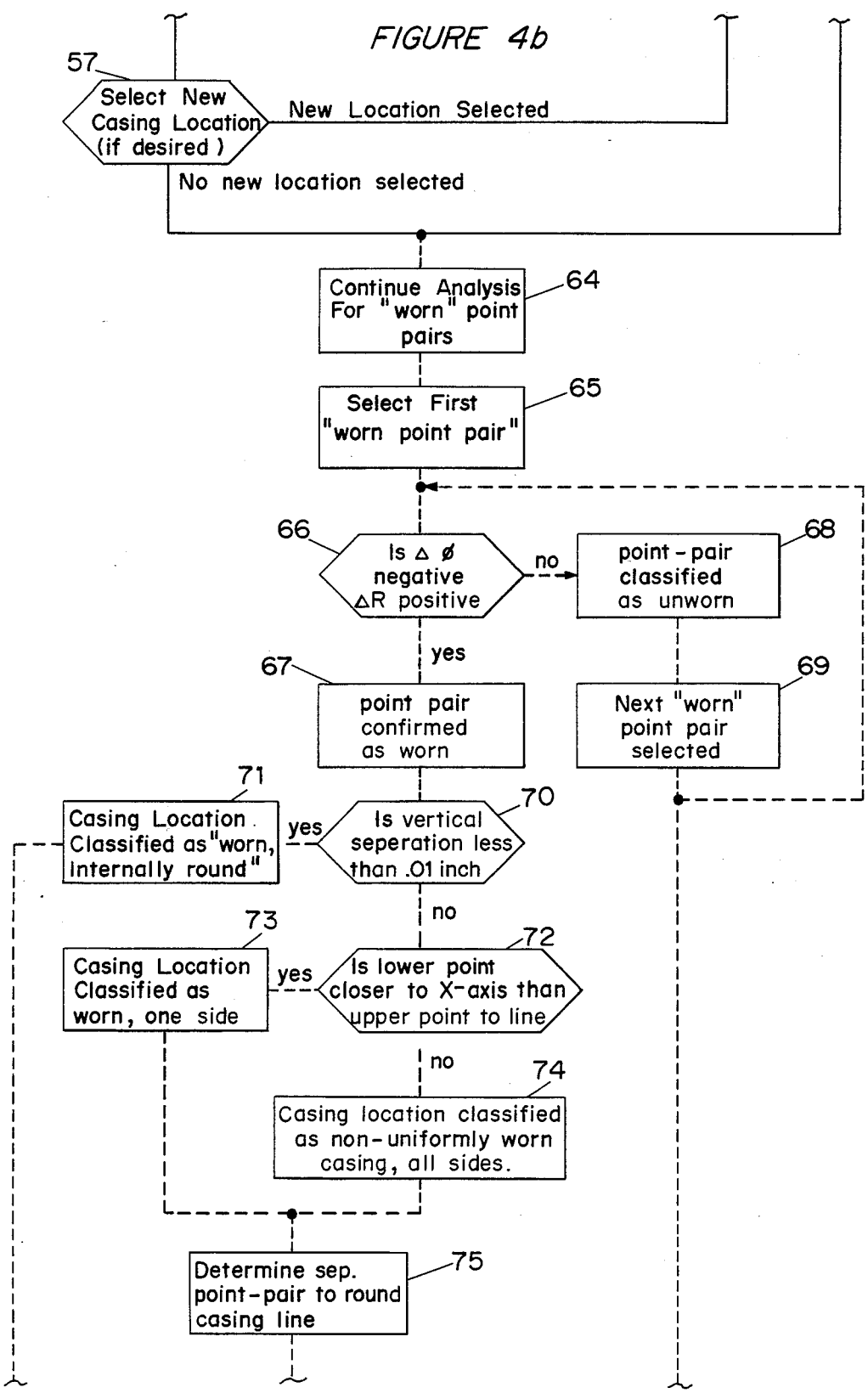

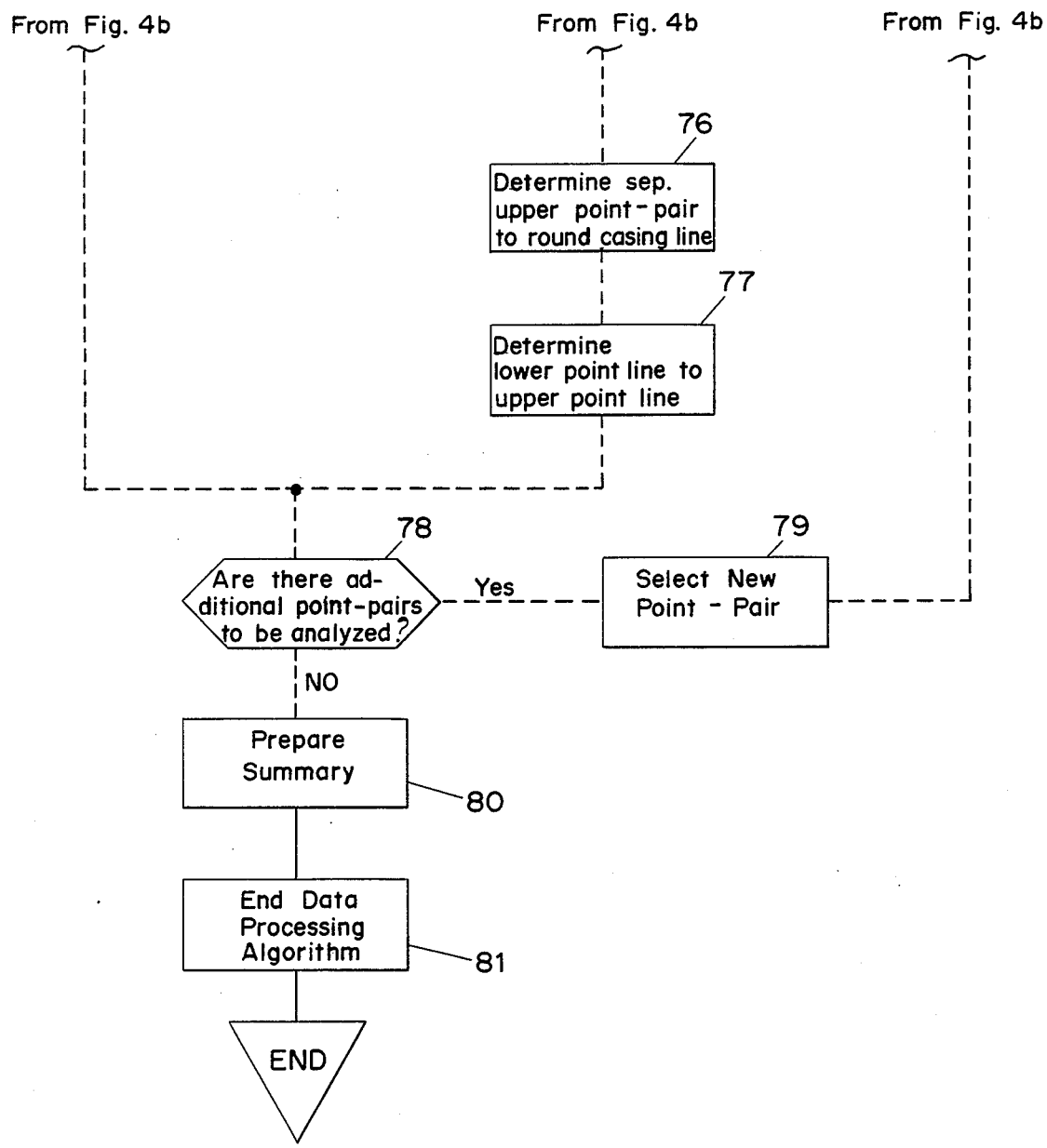

METHOD AND APPARATUS FOR MEASURING INTERNAL CASING WEAR

BACKGROUND OF THE INVENTION

This invention relates to methods of evaluating the condition of oilfield tubular goods. More specifically, this invention relates to methods and apparatus for determining by measurement the extent of internal wear of subsurface pipe or casing.

A variety of problems may result from internal casing wear. Drill pipe collars may rub the casing, and possibly lead to a blowout in the casing if extremely worn. In a production well, badly worn casing may permit the undesirable "thiefing" of the flow to unwanted zones and thereby reduce surface production. In an injection well, worn casing may permit the injected fluid to flow to undesired formations.

Internal wear, which is the removal of metal from the inside casing wall occurs in three principal patterns: loss of metal from only part of the inside casing wall while the rest is unworn; uniform loss of metal around the entire inside casing wall circumference; and non-uniform loss of metal around the entire inside casing wall. In addition, there are two patterns associated with unworn casing—round internally with all of the original metal in place, and elliptical with all of the metal in place.

A number of surveys are available for assessing internal wear in downhole casing. One such survey provides a depth recording which responds to the circumferential average of the well thickness of the casing metal still in place. In particular, this survey detects changes of the wall thickness and internal diameter of downhole casing. A typical inspection instrument for performing this survey is the casing inspection instrument marketed by Dresser Atlas under the name "Magnelog tool" and disclosed in the publication "Dresser Atlas Casing Evaluation Services," pages 4–5 and 61–79; said publication being herein incorporated by reference. During operation, an inspection instrument generates an alternating (AC) magnetic field of low frequency. As the tool passes through the survey interval, the field permeates the casing wall and is detected by the receiver portion of the tool. The received electromagnetic wave is both attenuated and phase shifted by the casing wall, with the degree of phase shift in relationship to the wall thickness (weight). The degree of phase shift is detected and transmitted over the wireline for surface recording.

The phase shift curve registers the phase shift between generation of the low frequency electromagnetic wave and reception of the wave by the tool's receiver portion. The degree of phase shift increases with the increasing thickness of the casing's wall. The degree of phase shift may then be used in the calculation of the average thickness of the casing wall. While such a survey adequately calculates average thickness, it cannot detect the least wall thickness of casing or the degree of "out-of-roundness". (The term "out-of-roundness" generally refers to any non-circumferential internal wear, particularly one-sided wear) Thus, it is a distinct possibility that such a survey may fail to identify dangerously worn casing.

A second survey available for assessing internal wear in downhole casing generates a depth recording of the greatest and least internal radii of the casing, thus allowing quantitative assessment of the degree to which the casing is internally worn or out-of-round. A typical instrument for performing this survey is the casing inspection instrument marketed by Dresser Atlas under the name "Multi-Finger Caliper tool" or "MFC tool" and disclosed in the publication "Dresser Atlas Casing Evaluation Services", pages 6 and 83–103; said publication having been previously incorporated by reference into this document. During operation, the MFC tool, which may include from 40 to 60 "feeler arms" which extend outwardly from the body of the tool in all directions, is centralized and all of the feeler arms extended outwardly from the tool for contact with the entire circumference of the inside casing wall at a particular depth. As the MFC tool moves through the casing, the feeler arms follow the contour of the casing's inside wall. The feeler arm with the maximum extension operates a first potentiometer (or other alternative device) which senses the greatest measured internal radius. The feeler arm with the least extension operates a second potentiometer (or other alternative device) which senses the smallest measured internal radius. The signals from the potentiometers are coupled through the electronics section and transmitted by the wireline to a recorder for presentation. While the MFC survey allows the evaluation of the degree to which the casing is internally out of round and permits estimating the greatest and least remaining wall thickness, the MFC survey cannot distinguish casing that is seriously worn on one side from unworn casing that is merely elliptical; in other words, severe one-sided wear may not be detected at all.

Thus, while both surveys are able to provide useful information regarding the internal wear of casing, both surveys fall short of being capable of providing a comprehensive evaluation of internal wear. For these reasons, a method for a combined casing evaluation survey became necessary so that an analytical technique which provided a comprehensive evaluation of internal casing wear would be possible. While separate evaluation of the results of the two separate survey followed by integrating the information derived from the surveys is possible, such a practice proved unworkable in actual use. A better method of achieving this goal of a comprehensive survey of internal casing wear is to devise a method by which selected data of the two previous surveys are combined and subject to a single analysis technique which will yield the desired more comprehensive internal casing wear evaluation.

SUMMARY OF THE INVENTION

Two inspection instruments which operate on different principals are tied together and the combination traverses a section of casing where information on the internal wear is desired. As the first inspection instrument passes through the casing section under investigation, the feeler arms of the first inspection instrument follow the contour of the inside wall. In response to the degree of extension of these arms, the first inspection instrument generates two signals related to the minimum and maximum wall thickness present at each location within the casing section. As the second inspection instrument passes through the casing, the second inspection instrument generates an electromagnetic wave which permeates the casing where the electromagnetic wave is both attenuated and phase shifted. The phase shifted electromagnetic wave is compared to the original electromagnetic wave to determine the degree of phase shift, the degree of phase shift being directly related to the wall thickness of the casing. The second inspection instrument then generates a signal related to the degree of phase shift at each location of the casing section.

The present invention analyzes three data series comprising the degree of phase shift, the minimum wall thickness, and the maximum wall thickness respectively present at each location along the casing section by means of a differential crossplot whereby for each location of the casing section under inspection, a point-pair is plotted, both points of the point-pair having the same phase shift curve differential (calculated from the degree of the phase shift data series) as the X-coordinate and a maximum and minimum radius curve differential (calculated from the minimum and maximum wall thickness data series respectively) as respective Y-coordinates. Analysis of the differential crossplot may then be made to provide useful information regarding internal casing wear. The subsequent calculation of the round casing line followed by the plotting of the round casing line onto the differential crossplot will permit more detailed analysis of the type and extent of internal wear present in the casing.

A feature of this invention is to determine which portions of a casing section under investigation may be classified as internally worn casing or internally unworn casing respectively. Another feature of this invention is to determine whether the unworn casing may be classified as heavier or lighter than normal. A third feature of this invention is to determine whether the unworn casing is of a different grade than normal. Yet another feature of this invention is to determine whether the internally worn casing is worn uniformly between two specified casing locations. Another feature of this invention is to determine whether internal wear at a selected casing location may be classified as internally round wear, one sided internal wear or non-uniform wear. Still another feature of this invention is the calculation of the circumferential extent of non-uniform casing wear at a specific location where non-uniform casing wear is present.

BRIEF DESCRIPTION OF THE DRAWINGS

The present invention may be better understood, and its numerous objects and advantages will become apparent to those skilled in the art by reference to the accompanying drawings.

FIGS. 4A-C is a flowchart detailing the steps necessary to process the data series received by the data processing system 18 of FIGS. 1 and 2.

DESCRIPTION OF THE PREFERRED EMBODIMENT

Figure 1:
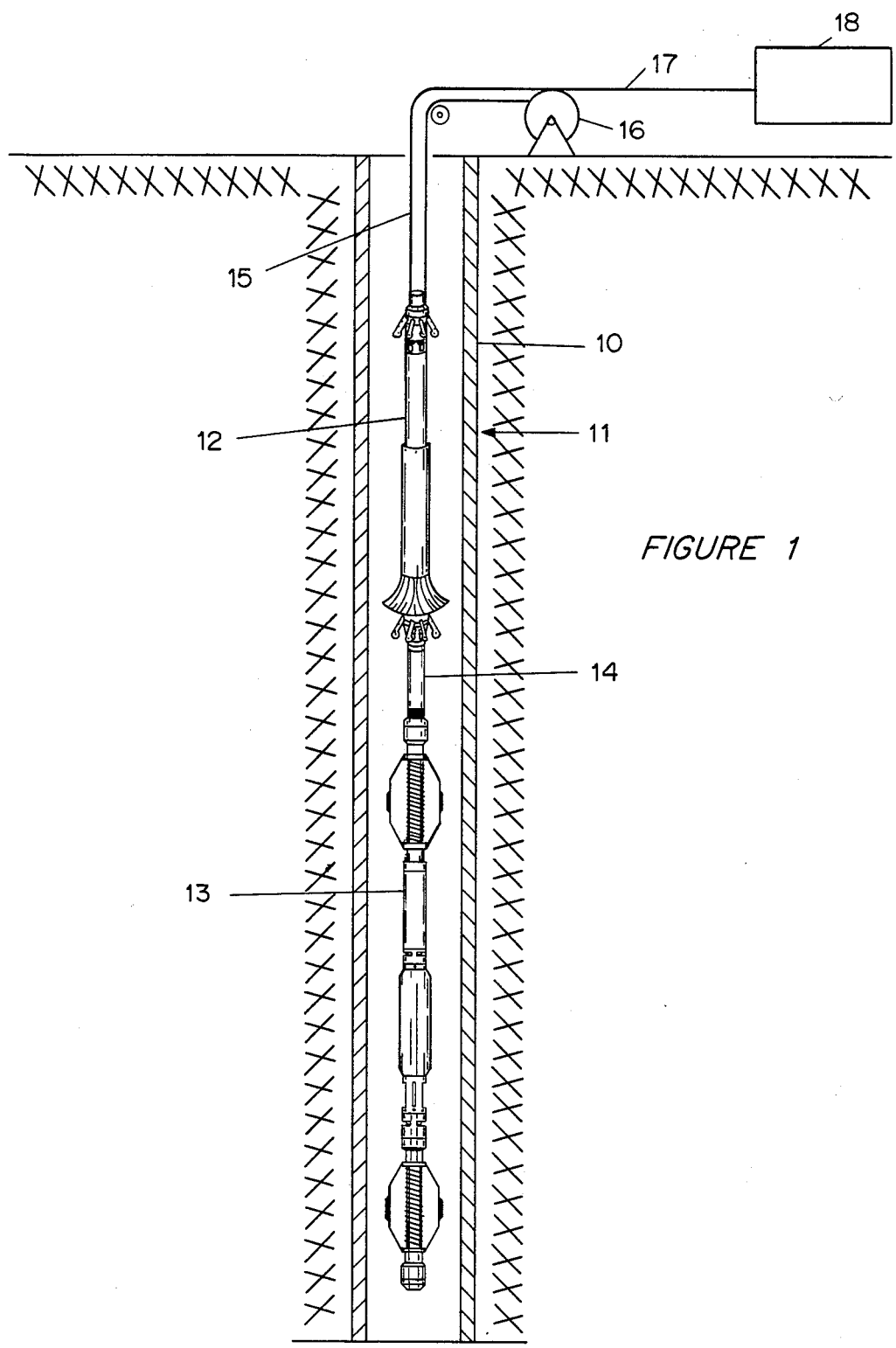
FIG. 1 is a representation of the first and second inspection instruments in operation in accordance with the principles of the present invention.

Referring to FIG. 1, a preferred embodiment of the present invention is shown as it will appear during the course of a typical inspection operation of a length of well piping such as a section of casing 10 which is ordinarily employed for lining the wall of a well bore 11. A first inspection instrument 12 is suspended from a first length of typical multi-conductor logging cable 15. A second inspection instrument 13 is tied beneath the first inspection instrument 12 by means of a second length of multi-conductor logging cable 14. The first length of a multi-conductor logging cable is spooled in the usual fashion of a winch 16 that is positioned at the surface and adapted for selectively moving the first inspection instrument 12 and second inspection instrument 13 through the casing 10. The conductors within the cable 15 are operatively connected by way of typical surface circuitry 17 to a data processing system 18 for the processing of the output signals from the first inspection instrument 12 and the second inspection instrument 13.

Figure 2:
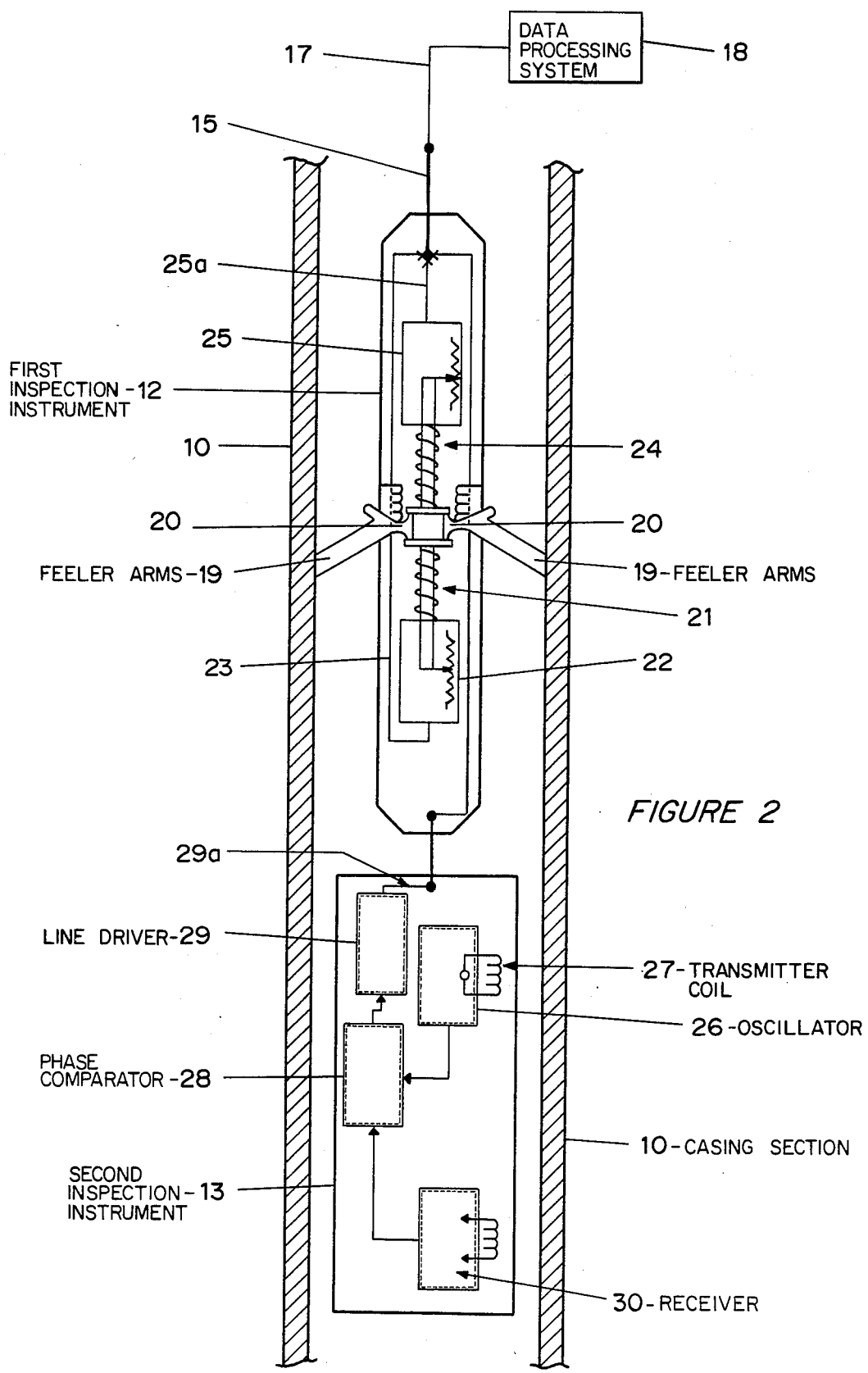
FIG. 2 is a representation of the primary components of the method for assessing internal casing wear, including some internal components of the first and second inspection instruments located within the casing section being surveyed.

Referring to FIG. 2, as the first inspection instrument 12 and the second inspection instrument 13 traverse the casing section 10 being surveyed, the feeler arms 19 of the first inspection instrument 12 follow the contour of the inside wall of casing section 10. The head 20 of the feeler arm 19 which extends outwardly the furthest distance due to the deepest internal wear along the interior circumference of the casing section 10 at a particular depth compresses a first lever 21 which in turn controls a first potentiometer 22 which sends out negative pulses in proportion to the degree of the compression of lever 21 for transmission of the negative pulses via a conductor 23, a multi-conductor logging cable 15 and surface circuitry 17 to a data processing system 18 for the analysis of the received data. In a similar fashion, the head 20 of the feeler arm 19 which extend outwardly the least distance due to either the shallowest internal wear, no internal wear or a restriction in the casing along the interior circumference of the casing section 10 at a particular depth compresses a second lever 24 which in turn controls a second potentiometer 25 which sends out positive pulses in proportion to the degree of the compression of lever 24 for transmission of positive pulses via a conductor 25a, a multi-conductor logging cable 15 and surface circuitry 17 to a data processing system 18 for the analysis of the received data.

Simultaneously with the above procedure, a low frequency oscillator 26 within the second inspection instrument 13 generates an electromagnetic wave which excites a transmitter coil 27 which in turn generates an alternating (a.c.) magnetic field of low frequency. In addition, the outut of oscillator 26 is coupled to a phase comparator 28. The electromagnetic field permeates the casing section 10 where the electromagnetic field is both attenuated and phase shifted by the casing section 10. The degree of phase shift of the electromagnetic field is directly related to the wall thickness of the casing section. The attenuated and phase shifted electromagnetic field is detected by a low frequency receiver 30 and is transmitted by the low frequency receiver 30 to the phase comparator 28. The phase comparator 28 compares the two received electromagnetic wave and determines the phase shift for the surveyed portion of the casing section 10. The output of the phase comparator 28 is coupled to a line driver 29 for transmission of the detected phase shift via conductor 29a, multi-conductor logging cable 14, conductor 30, multi-conductor logging cable 15, and surface circuitry 17 to a data processing system 18 for analysis of the received data.

As the first inspection instrument 12 and second inspection instrument 13 traverse the casing section 10, the above-described procedure is repeated continuously with the end result being that the data transmitted to the data processing system consists of three data series (the degree of phase shift, the maximum internal radius and the minimum internal radius present at each location along the casing section 10 under inspection).

Figure 3:
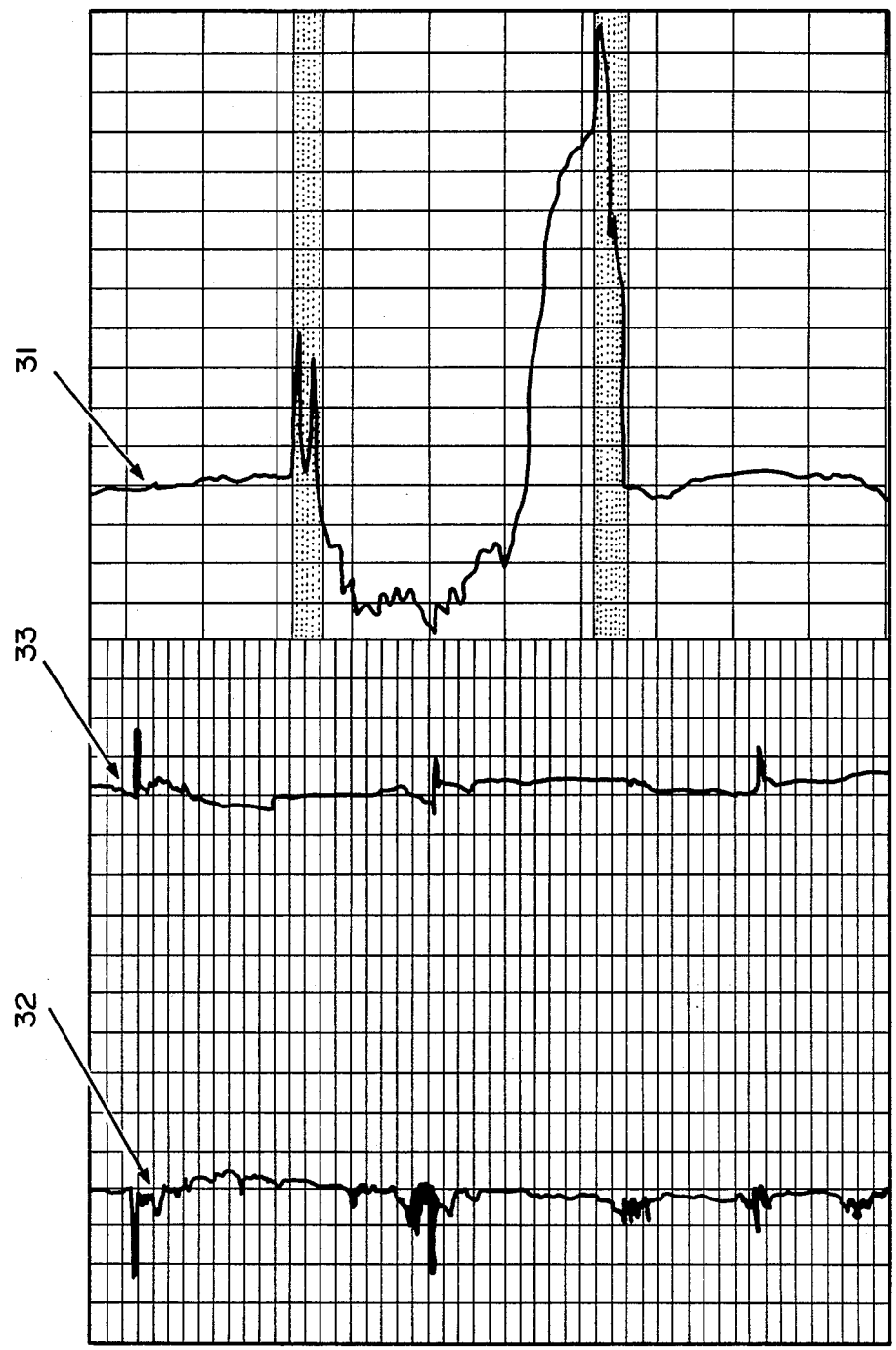
FIG. 3 is an example of the data received by the data processing system 18 of FIGS. 1 and 2.

Referring to FIG. 3, an example of the data received by the data processing system is shown. Curve 31 displays the degree of phase shift of the electromagnetic wave at each location along the casing section 10 under inspection. Curve 32 displays the maximum internal radius of the casing at each location of the casing section 10 under inspection. Curve 33 displays the minimum internal radius of the casing at each location of the casing section 10 under inspection.

A combined casing survey using multiple inspection instruments like the survey shown in FIG. 3 may be analyzed quantitatively by means of a differential crossplot. On this crossplot a differential phase shift curve ($\Delta\phi$) is plotted on the X-axis, with positive differentials to the right of zero, and negative differentials to the left of zero. On the Y-axis differentials of the maximum and minimum radius curves ($\Delta R$) are plotted, with positive differentials above zero and negative differentials below zero. When the measurements of a combined survey are crossplotted at a single depth, the result is a pair of points, one associated with each measured radius, and each having the same X-axis coordinate. This pair of points is referred to as a "differential point-pair". Defining the differential minimum radius as $\Delta R_1$ and the differential maximum radius as $\Delta R_2$, the upper point of the point-pair has coordinates ($\Delta\phi$, $\Delta R_2$) and the lower point has coordinates ($\Delta\phi_1$, $\Delta R_1$) In order to generate plot of differential point-pairs, it is necessary to establish a reference value for the Phase Shift curve as well as a single reference value for the radius measurements. With these references established, the differential Phase Shift ($\Delta\phi$) is defined as the recorded phase shift diminished by its reference value:

$\Delta\phi$ = phase shift (recorded) − phase shift (reference)

and the differential radii are similarly defined:

differential minimum radius ($\Delta R_1$)

= minimum radius (recorded)

− radius (reference)

differential maximum radius ($\Delta R_2$)

= maximum radius (recorded)

− radius (reference)

The reference values may be established from API specification, from averages of the log responses in the particular survey, or from the log responses in a selected joint which is included in the particular survey. When references are established from API specifications, the radius reference is equal to one-half of the specified inside diameter for the casing's particular outside diameter and weight-per-foot. In order to establish the phase shift reference, a calibration curve appropriate to the casing's particular outside diameter and grade is used. The weight-per-foot from the API specifications is located on the X-axis of the calibration curve and the corresponding phase shift response is determined by projecting vertically to intersect the calibration curve and then horizontally to intersect the Y-axis. The phase shift at the Y-axis intersection is used as the phase shift reference.

When the references are established from the log itself, it is best to establish them from joints that are internally uniform (maximum radius and minimum radius effectively the same) and with a wall thickness (from either survey) that substantially agrees with the API specifications. After these joints are identified, the references are determined as the actual log responses in a single joint, or as the average of the log responses over several joints.

Figure 4A:
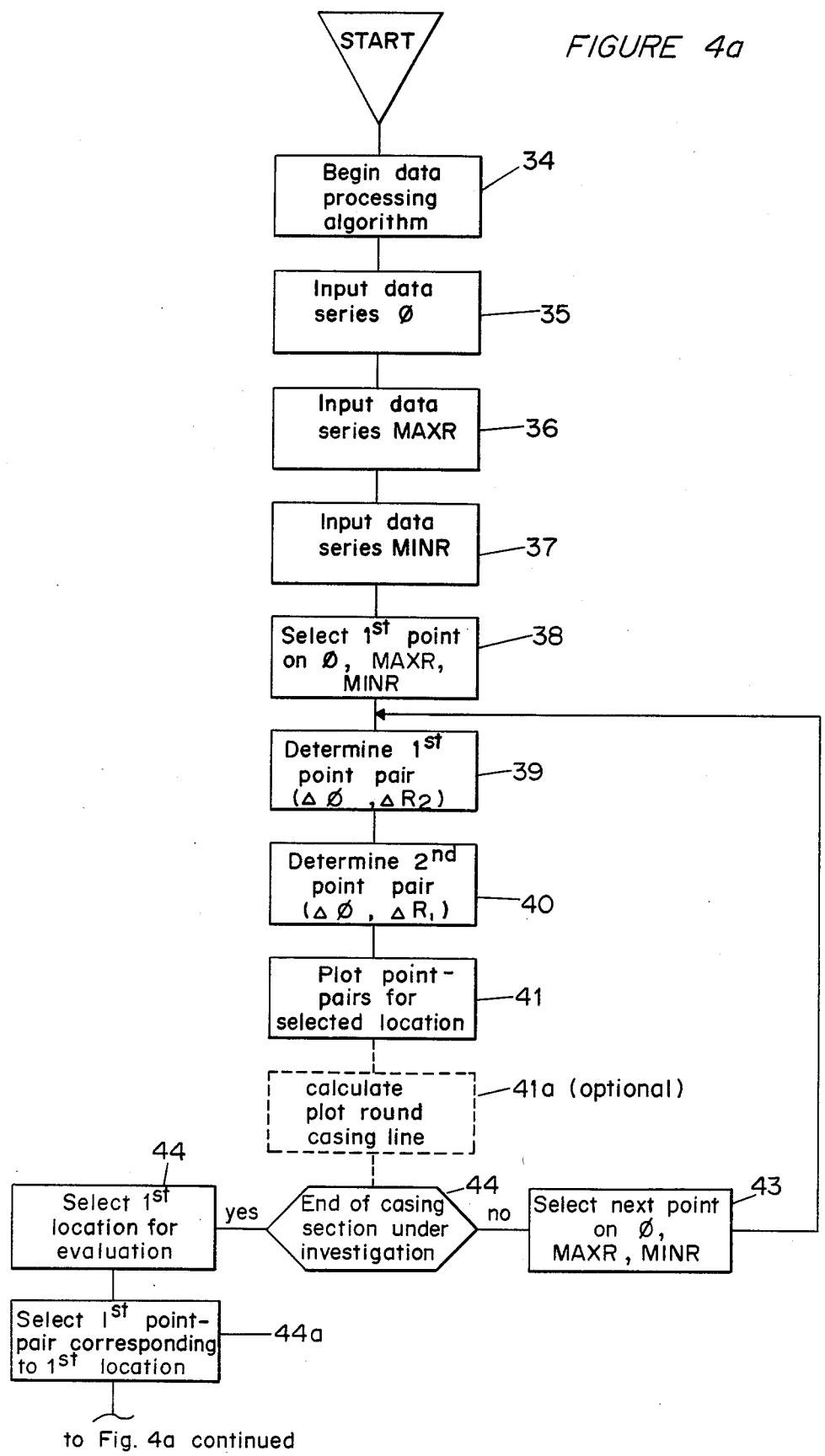

Referring to FIG. 4, a flow chart describing the major steps in analyzing the acquired data by the data processing system 18 of FIGS. 1 and 2 is shown. The data processing algorithm begins at step 34. A data series called $\phi$ comprising the degree of phase shift at each point along the casing section 10 under inspection is input into the data processing system at 35. A second data series called MAXR comprising maximum radius at each location along the casing section 10 under inspection is input into the data processing system at 36. A third data series called MINR comprising minimum radius at each location along the casing section 10 under inspection is input into the data processing system at 37. A first point on the $\phi$, MAXR, and MINR data series corresponding to the initial location of the casing section 10 to be analyzed is selected at 38. A first point pair ($\Delta\phi,\Delta R_2$) for the selected point is determined at 39. A second point pair ($\Delta\phi,\Delta R_1$) for the selected point is determined at 40. Point pairs ($\Delta\phi,\Delta R_2$) and ($\Delta\phi,\Delta R_1$) for the selected location are plotted on the X-Y graph, at step 41, with $\Delta\phi$ plotted on the X-axis, with positive differentials to the right of zero, and $\Delta R$ (includes both $\Delta R_1$ and $\Delta R_2$ points) along the Y-axis, with positive differentials above zero and negative differentials below zero. Optional step 41a, which is the calculation and plotting of the Round Casing Line for the particular casing being analyzed, may be performed at this point. The round casing line, which is more fully explained later in this document, is of the equation $$\Delta R = \frac{-K^1}{2R_1} \Delta\phi.$$

The calculation and plotting of the line will permit the determination of a more detailed assessment of internal casing wear. Inquiry will be made at step 42 whether the end of the casing section 10 under investigation has been reached. If all data corresponding to the casing section has been plotted on the X-Y graph at 42, then the data processing algorithm will proceed to step 44. If all appropriate data has not been plotted at 42, then the next point on the $\phi$, MAXR and MINR data series corresponding to the next point on the casing section 10 under inspection is selected at 43. The data processing algorithm then returns to step 39 for further processing.

An analysis of internal wear of the casing section under investigation begins at step 44 with the selection of the first location within the casing where evaluation is desired. The differential point-pair corresponding to the first location is selected at 44a. The vertical separation of the two points comprising the point pair is determined at 45. If the vertical separation is determined at 46 to be less than a first preselected reference value such as 0.01 inches on the $\Delta R$ axis, the casing at the selected location will be classified as unworn at 47. If the vertical separation of the 2 points is determined to exceed the first preselected reference value at 46, the casing will be classified as worn at 48. For a casing location classified as unworn, classification of the unworn casing as heavier, lighter, or normal weight begins at step 49. 'Normal weight', as used here, refers to casing which has a weight-per-foot value conforming to American Petroleum Institute specification for that particular type of casing. The vertical distance between the selected point-pair and the X-axis is calculated at step 49. If the separation is determined to exceed a second preselected reference value such as 0.02 inches on the ΔR axis, the casing location is classified as "lighter than normal" at 51. If the separation is determined to be between −0.02 and +0.02 inches, the casing location is classified as "normal" at 52. A separation exceeding a third preselected reference value such as +0.02 inches ill result in a classification of the casing location as "heavier than normal" at 53. For casing locations classified as normal at 52, the horizontal separation between the point-pair and the origin is determined at 54. Should the separation fall between a preselected range such as −10 and +10 degrees on the Δφ axis at step 55, the casing location will be classified as "same grade" at 56. Should the separation fall outside this range, the casing location will be classified as "different grade" at 56′. Here, the term "different grade" refers to a grade different from the grade used to determine the phase shift reference. If analysis of additional casing locations are desired, a new casing location is selected at 57 followed by a return to step 45 for further analysis. If no further locations are to be analyzed, the procedure continues at step 64.

Returning to casing locations classified as worn in step 48, a second location to be analyzed is selected in step 58. A second point-pair corresponding to the second location is calculated at step 59. The separation distance between the two points of the second point pair is determined at step 60. If the separation distance of the second point-pair closely approximates the separation distance of the first point-pair at step 60a, the casing is classified as uniformly worn between the two selected locations at 61. If the separation distance of the second point-pair differs from the separation distance of the first point-pair by more than a preselected reference value such as 0.01 inches, the casing is classified as non-uniformly worn between the two selected locations a 62. If analysis of additional casing locations are desired, a new casing location is selected at 63, followed by a return to step 45 for further analysis. If no further locations are to be analyzed, the procedure continues at step 64.

While point-pairs corresponding to selected locations of the casing section 10 under investigation may be analyzed after being plotted on the X-Y graph to provide useful information regarding the extend of internal wear within the casing, a better assessment of the internal wear of the casing section 10 which also includes a determination of whether the internal casing wear may be classified as internally round wear or as one sided (also known as "out of round") wear as well as a determination of the circumferential extent of non-uniform internal casing wear may also be performed. Such types of analysis, while of extreme importance in the assessment of internal casing wear, cannot be performed without the calculation of the round casing line.

The casing surveys performed by both the first and second inspection instruments can be considered a function of the casing weight. Therefore, a relationship between differential phase shift and differential radius can be established. This linear relationship, often called the Round Casing Line takes the form of the equation:

$$\Delta R = \frac{K_1}{2 R_1} \Delta \phi_1$$

where
 ΔR = differential radius, inches
 $R^1$ = reference radius to inner casing wall, inches
 Δφ = differential phase shift, degrees lbs/ft $$K^1 = \frac{l\mu\mu k}{\pi\rho},$$

where K (of units degree) being a constant dependent in the particular casing used.
 ρ = metal density, lbs/ft³

If optional step 41A has been performed, then a series of additional steps which provide additional analysis of the internal wear of the casing may be performed. If step 41A has not been performed, then steps 64–79 should be skipped and the analysis procedure should recommence at step 80.

Analysis continues at step 64 for those point-pairs corresponding to casing locations which had been previously classified as worn casing locations. A first differential point-pair corresponding to a casing location previously classified as worn is selected at 65. If Δφ is found to be negative and ΔR is found to be positive for the point-pair at 66, the point-pair is confirmed as corresponding to a worn casing location at 67. If these requirements are not met at 66 the point-pair is classified as unworn at 68, the next differential point-pair previously classified as corresponding to a worn casing location is selected at 69 and a return to step 66 occurs.

Returning to step 67, if the vertical separation of the point-pair is found at step 70 to be less than a preselected reference value each 0.01 inch, the casing location corresponding to the point-pair is classified at step 71 to be worn-casing, internally round. If the vertical separation exceeds 0.01 inch, then the point-pair is examined at 72, to ascertain whether the lower point is closer to the X-axis than the upper point is to the round casing line. If this condition is true, then the casing location corresponding to the point-pair is classified at 73 as worn casing, one side only. If this condition is answered in the negative, then the casing location corresponding to the point-pair is classified at 74 as non-uniformly worn casing, all sides.

The circumferential extent of wear (i.e. the extent to which the wear area of casing extends completely around the casing) may now be determined for casing that is internally worn and out-of-round. By definition, out-of-round casing includes both the classifications of wear "worn, one side" and "non-uniformly worn casing". Proceeding from point-pairs correlating to casing locations classified as "worn, one side" at step 73 or from point-pairs correlating to casing locations classified as "non-uniformly, worn casings, all sides" at step 74. The separation between the lower point of the point-pair and the point on round casing line which would create a horizontal line parallel to the X-axis is measured at 75. The separation between the upper point of the point-pair and the point on the round casing line which would create a horizontal line parallel to the X-axis is measured at 76. A ratio of the separation of the lower point of the point-pair from the round casing line to the separation of the upper point of the point-pair from the round casing line is calculated at 77. This ratio gives a calculation of the circumferential extent of the casing wear as a fraction of the entire inner circumference of the casing. Proceeding from either step 71 or step 77, step 78 determines if there are any more point-pairs corresponding to worn casing locations to be analyzed. If there are additional point-pairs to be analyzed, a new point-pair corresponding to a casing location classified as worn is selected at 79 followed by a return to step 66. If it is determined at step 78 that no remaining point-pairs are to be analyzed, a summary of all casing locations analyzed and their classification with respect to worn or unworn status as well as the type of worn or unworn casing is prepared at 80. The data processing algorithm then ends at step 81.

The embodiment of the invention in which an exclusive property or privilege is claimed are defined as follows:

1. A method of identifying the presence of internal casing wear in a casing section under inspection by passing a first and second inspection instrument through said casing section and submitting the outputs of said first and second inspection instruments to a process of analysis comprising the steps of:
   (a) deriving a first and second data series from the output of said first inspection instrument;
   (b) deriving a third data series from the output of said second inspection instrument;
   (c) selecting a first point from said first, second, and third data series corresponding to a first location within said casing;
   (d) calculating a first point-pair corresponding to said first location within said casing;
   (e) determining the vertical separation of the upper point of said first point-pair and the lower point of said first point-pair; and
   (f) analyzing said vertical separation to determine whether internal casing wear is present at said first location within said casing.

2. A method of identifying the presence of internal casing wear in a casing section under inspection comprising:
   (a) passing a first inspection instrument through said casing section;
   (b) passing a second inspection instrument through said casing section;
   (c) deriving a first, second and third data series from the output of said first and second inspection instruments;
   (d) selecting a first point of said first, second and third data series corresponding to a first location of said casing sections;
   (e) analyzing said first point of said first, second and third data series to determine the presence of casing wear at said first location; and
   (f) repeating steps (d) through (e) for all locations of said casing section where analysis for the presence of casing wear is desired.

3. The method of claim 2 wherein the step of analyzing said first point of said first, second and third data series to determine the presence of casing wear at said first location further comprises the steps of:
   calculating a first point-pair corresponding to said first location within said casing; and
   analyzing said first point-pair to determine the presence of casing wear at said location.

4. The method of claim 3 wherein the step of analyzing said first point-pair to determine the presence of casing wear at said location further comprises the steps of:
   determining the vertical separation of the upper point of said first point-pair and the lower point of said first point-pair; and
   analyzing said vertical separation to determine whether internal casing wear is present at said first location.

5. The method of claim 4 further comprising the step of:
   plotting said first point-pair on a Cartesian coordinate.

6. The method of claim 5 further comprising the steps of:
   selecting said first point-pair for further analysis if said first point-pair corresponds to a location an said casing where no wear is present;
   calculating the vertical separation of said first point-pair and the X-axis of said Cartesian coordinate; and
   classifying said casing further at said location corresponding to said first point-pair based on said vertical separation.

7. The method of claim 5 further comprising the steps of:
   selecting said first point-pair for further analysis if said first point-pair corresponds to a location on said casing where no wear is present;
   calculating the horizontal separation of said first point-pair and the Y-axis of said Cartesian coordinate; and
   classifying said casing further at said location corresponding to said first point-pair based on said horizontal separation.

8. The method of claim 2 wherein said first and second instruments are passed through said casing section simultaneously.

9. The method of claim 2 further comprising the steps of:
   selecting a first point of said first, second and third data series corresponding to a first location of said casing where wear is present;
   calculating a first point-pair corresponding to said first location of said casing where wear is present;
   selecting a second point of said first, second and third data series corresponding to a second location of said casing where wear is present;
   calculating a second point-pair corresponding to said second location of said casing where wear is present; and
   analyzing the relationship between said first and second point-pairs to clarify the type of wear present along the casing section bounded by said first and second points.

10. The method of claim 9 wherein the step of analyzing the relationship between said first and second point-pairs to classify the type of wear present along the casing section bounded by said first and second points further comprises the steps of:
    calculating the separation distance of the two points of said first point-pair;
    calculating said separation distance of the two points of said second point-pair;

comparing said separation distances of said first and second point-pairs; and classifying said type of wear present along the casing section bounded by said first and second points.

11. A method of identifying the presence of internal casing wear in a casing section under inspection comprising:
  (a) passing a first inspection instrument through said inspection section;
  (b) passing a second inspection instrument through said casing section;
  (c) deriving a first, second and third data series from the output of said first and second inspection instruments;
  (d) selecting a first point of said first, second and third data series corresponding to a first location of said casing sections;
  (e) calculating a first point-pair corresponding to said first location of said casing section;
  (f) calculating a first casing line for said casing; and
  (g) analyzing said casing section at said first point based on the relationship of said first point and said first casing line.

12. The method of claim 11 wherein the step analyzing said casing section at said first point based on the relationship of said first point and said first casing line further comprises the steps of:
  plotting said first point on a coordinate;
  plotting said casing line on the same coordinate; and
  analyzing said plot to classify the presence and type of wear of said casing corresponding to said first point.

13. The method of claim 12 wherein the step of analyzing said plot to classify the presence and type of wear of said casing corresponding to said first point further comprises:
  calculating the separation distance between the upper and lower points of said first point-pair and said casing lines; and
  calculating the circumferential extent of casing wear at said first location.

* * * * *